United States Patent
Huang

(10) Patent No.: US 9,453,601 B2
(45) Date of Patent: Sep. 27, 2016

(54) JOINT FOR EXPANSIBLE HOST

(71) Applicant: Huang FU Huang, Changhua County (TW)

(72) Inventor: Huang FU Huang, Changhua County (TW)

( * ) Notice: Subject to any disclaimer, the term of this patent is extended or adjusted under 35 U.S.C. 154(b) by 371 days.

(21) Appl. No.: 14/105,170

(22) Filed: Dec. 12, 2013

(65) Prior Publication Data

US 2015/0167875 A1 Jun. 18, 2015

(51) Int. Cl.
*F16L 33/207* (2006.01)
*F16L 33/22* (2006.01)
*F16L 35/00* (2006.01)

(52) U.S. Cl.
CPC .............. *F16L 33/224* (2013.01); *F16L 35/00* (2013.01)

(58) Field of Classification Search
CPC ... F16L 33/10; F16L 33/224; F16L 33/2073; F16L 15/002; F16L 15/008
USPC ................................................. 285/247, 249
See application file for complete search history.

(56) References Cited

U.S. PATENT DOCUMENTS

| 418,906 | A | * | 1/1890 | Bosworth | F16L 33/224 285/249 |
|---|---|---|---|---|---|
| 2,464,416 | A | * | 3/1949 | Raybould | F16L 33/224 285/249 |
| 4,032,177 | A | * | 6/1977 | Anderson | F16L 33/224 285/24 |
| 4,162,092 | A | * | 7/1979 | Hayes | F16L 33/224 285/148.18 |
| 4,427,219 | A | * | 1/1984 | Madej | F16L 47/04 285/249 |
| 4,736,969 | A | * | 4/1988 | Fouts | F16L 33/223 285/245 |
| 5,332,269 | A | * | 7/1994 | Homm | B25B 27/10 285/249 |
| 5,797,633 | A | * | 8/1998 | Katzer | F16L 33/222 285/243 |
| 6,347,729 | B1 | * | 2/2002 | Spriegel | F16L 33/223 222/409 |
| 2004/0217589 | A1 | * | 11/2004 | Mittersteiner | F16L 33/225 285/255 |
| 2011/0163530 | A1 | * | 7/2011 | Shih | F16L 33/224 285/24 |
| 2013/0087205 | A1 | * | 4/2013 | Berardi | F16L 11/00 137/1 |

FOREIGN PATENT DOCUMENTS

| GB | 430356 | A | * | 6/1935 | .......... F16L 33/2073 |
|---|---|---|---|---|---|
| GB | 959100 | A | * | 5/1964 | ............ F16L 33/224 |

* cited by examiner

*Primary Examiner* — Christine T Cajilig

(57) ABSTRACT

A joint includes a cylinder, a C-clip and a ring. The cylinder includes a thread and a nozzle. The nozzle includes a neck and a head. The head includes a rear face and a front face. The C-clip includes a front end and placed on a first section of an expansible hose. Thus, a second section of the expansible hose is placed between the front end of the C-clip and the rear face of the head. Moreover, a fold between the first and second sections of the expansible hose is stuck between the nozzle and the C-clip. The ring includes a thread and a frusto-conical face. The thread of the ring is engaged with the thread of the cylinder. The frusto-conical face of the ring is located near the frusto-conical external face of the neck to force the C-clip to press the first section of the expansible hose on the neck.

7 Claims, 7 Drawing Sheets

JOINT FOR EXPANSIBLE HOST

BACKGROUND OF INVENTION

1. Field of Invention

The present invention relates to an expansible hose and, more particularly, to a joint for an expansible hose.

2. Related Prior Art

Referring to FIGS. 5 to 8, a conventional joint 900 includes a cylinder 920 and a ring 940. The cylinder 920 includes a nozzle 922 that is shaped like a mushroom. In operation, the cylinder 920 is connected to a faucet. An expansible hose 960 is inserted through the ring 940. The nozzle 922 is inserted in the expansible hose 960. A thread formed on an internal side of the ring 940 is engaged with a thread formed on an external side of the cylinder 920 so that the ring 940 is connected to the cylinder 920. Two things are expected. At first, the expansible hose 960 is expected to be firmly joined to the joint 900.

Secondly, there is expected to be no leak. However, the joint 900 does not come up to the expectations. The gap between the ring 940 and the nozzle 922 is constant while the thickness of the expansible hose 960 is reduced as the length and diameter of the expansible hose 960 are increased in operation. Hence, there is leak. Moreover, the expansible hose 960 could easily be detached from the joint 900.

The present invention is therefore intended to obviate or at least alleviate the problems encountered in the prior art.

SUMMARY OF INVENTION

It is the primary objective of the present invention to provide a reliable joint for an expansible hose.

To achieve the foregoing objective, the joint includes a cylinder, a C-clip and a ring. The cylinder includes a thread and a nozzle. The nozzle includes a neck and a head. The head includes a rear face and a front face. The C-clip includes a front end and placed on a first section of an expansible hose. Thus, a second section of the expansible hose is placed between the front end of the C-clip and the rear face of the head. Moreover, a fold between the first and second sections of the expansible hose is stuck between the nozzle and the C-clip. The ring includes a thread and a frusto-conical face. The thread of the ring is engaged with the thread of the cylinder. The frusto-conical face of the ring contacts the frusto-conical external face of the neck to force the C-clip to press the first section of the expansible hose on the neck.

Other objectives, advantages and features of the present invention will be apparent from the following description referring to the attached drawings.

BRIEF DESCRIPTION OF DRAWINGS

The present invention will be described via detailed illustration of the preferred embodiment versus the prior art referring to the drawings wherein.

DETAILED DESCRIPTION OF PREFERRED EMBODIMENT

Figure 1:
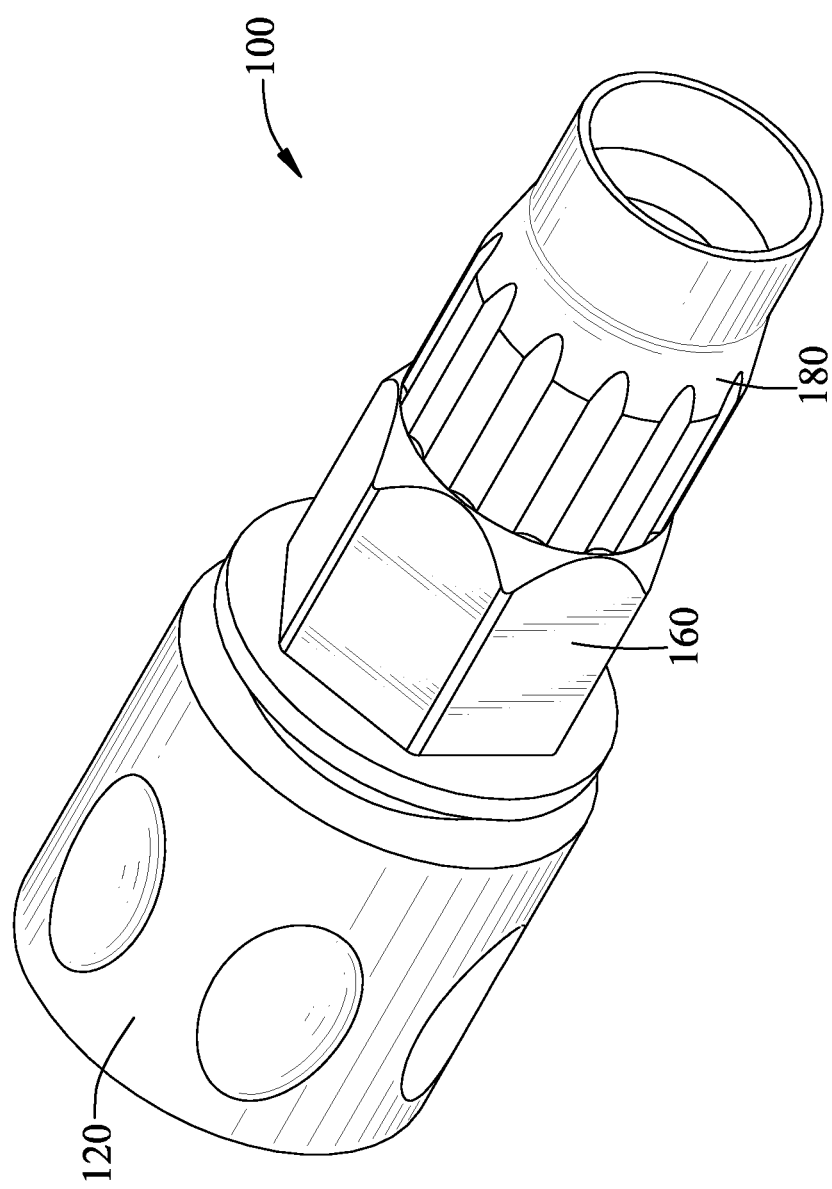
FIG. 1 is a perspective view of a joint according to the preferred embodiment of the present invention.
Figure 2:
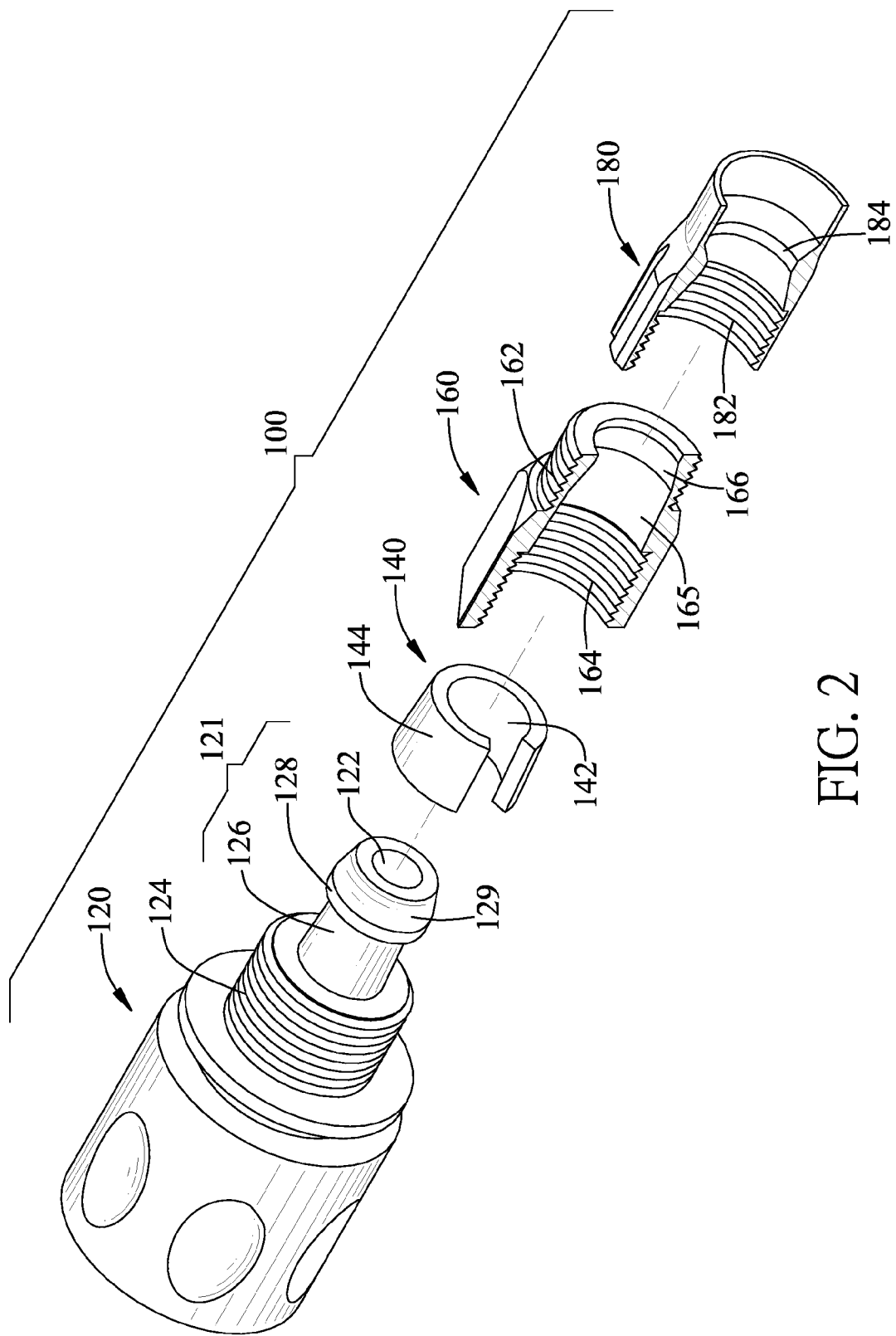
FIG. 2 is an exploded view of the joint shown in FIG. 1.

Referring to FIGS. 1 and 2, there is a joint 100 according to the preferred embodiment of the present invention. The joint 100 includes a cylinder 120, a C-clip 140 and two rings 160 and 180. The cylinder 120 includes a channel 122 through which water can run. On an external side, the cylinder 120 includes a thread 124 and a nozzle 121. The nozzle 121 includes a neck 126 and a head 128 with a diameter larger than that of the neck 126. The neck 126 includes a frusto-conical external face that shrinks toward the head 128. The head 128 includes a planar rear face 127 and a frusto-conical front face 129. There is a sharp angle between the planar rear face 127 of the head 128 and the frusto-conical external face of the neck 126. The frusto-conical front face 129 of the head 128 shrinks as it extends from the neck 126.

The C-clip 140 is an elastic element. The C-clip 140 is formed with a frusto-conical internal face 142 and a frusto-conical external face 144. The frusto-conical internal face 142 of the C-clip 140 is shaped in compliance with the frusto-conical external face of the neck 126.

On an internal face, the first ring 160 includes a thread 164 and two frusto-conical faces 165 and 166. The first frusto-conical face 165 is located between the second frusto-conical face 166 and the thread 164 along an axis of the first ring 160. The thread 164 is shaped and sized in compliance with the thread 124. The frusto-conical face 166 is shaped in compliance with the frusto-conical front face 129 of the head 128. On an external face, the first ring 160 is formed with a thread 162.

On an internal face, the second ring 180 is formed with a thread 182 and a frusto-conical face 184. The thread 182 is shaped and sized in compliance with the thread 162. The frusto-conical face 184 shrinks as it extends from the thread 182.

Figure 3:
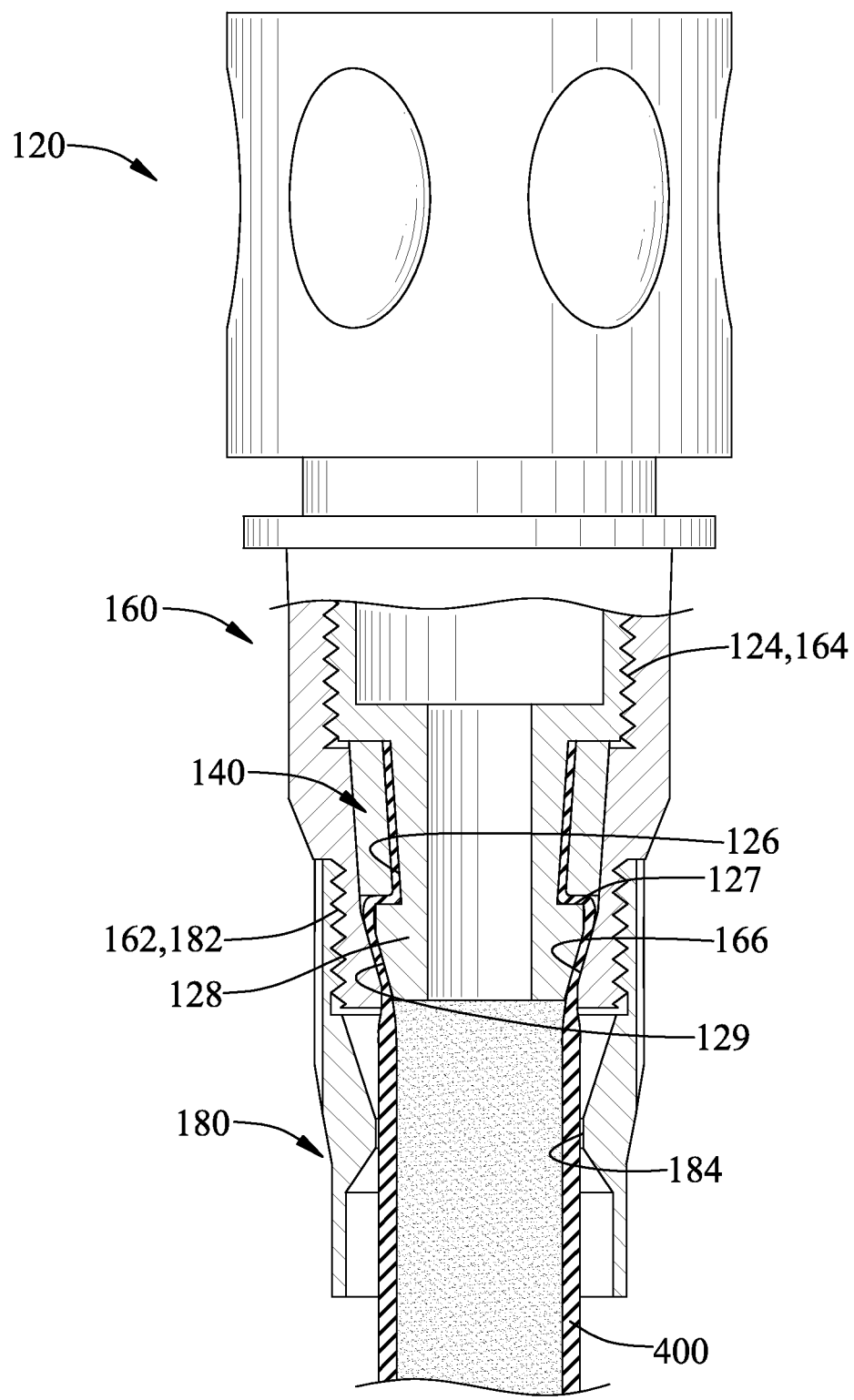
FIG. 3 is a cross-sectional view of the joint shown in FIG. 1 and an expansible hose.

Referring to FIG. 3, an expansible hose 400 is inserted through the second ring 180 and the first ring 160. The nozzle 121 is inserted in the expansible hose 400.

The C-clip 140 is placed on a first section 402 of the expansible hose 400. Thus, the first section 402 of the hose 400 is sandwiched between the neck 126 and the internal face 142 of the clip 140. Moreover, a second section (404) of the expansible hose 400 is sandwiched between the planar rear face (127) of the head 128 and a front end of the C-clip 140.

The thread 164 is engaged with the thread 124 to connect the first ring 160 to the cylinder 120. Thus, a third section 406 of the expansible hose 400 is sandwiched between the front face 129 of the head 128 and the frusto-conical face 166.

The match of the frusto-conical external face of the neck 126 with the frusto-conical internal face 142 of the C-clip 140 and the match of the frusto-conical external face 144 of the C-clip 140 with the first frusto-conical face 165 of the first ring 160 squeeze the first section 402 of the expansible hose 400 tighter between the neck 126 and the C-clip 140 as the thread 164 is tighter engaged with the thread 124. The match of the frusto-conical front face 129 of the head 128 with the second frusto-conical face 166 of the first ring 160 squeezes the third section 406 of the expansible hose 400 tighter between the head 128 and the first ring 160 as the thread 164 is tighter engaged with the thread 124.

Finally, the thread 182 is engaged with the thread 162 to connect the second ring 180 to the first ring 160.

Figure 4:
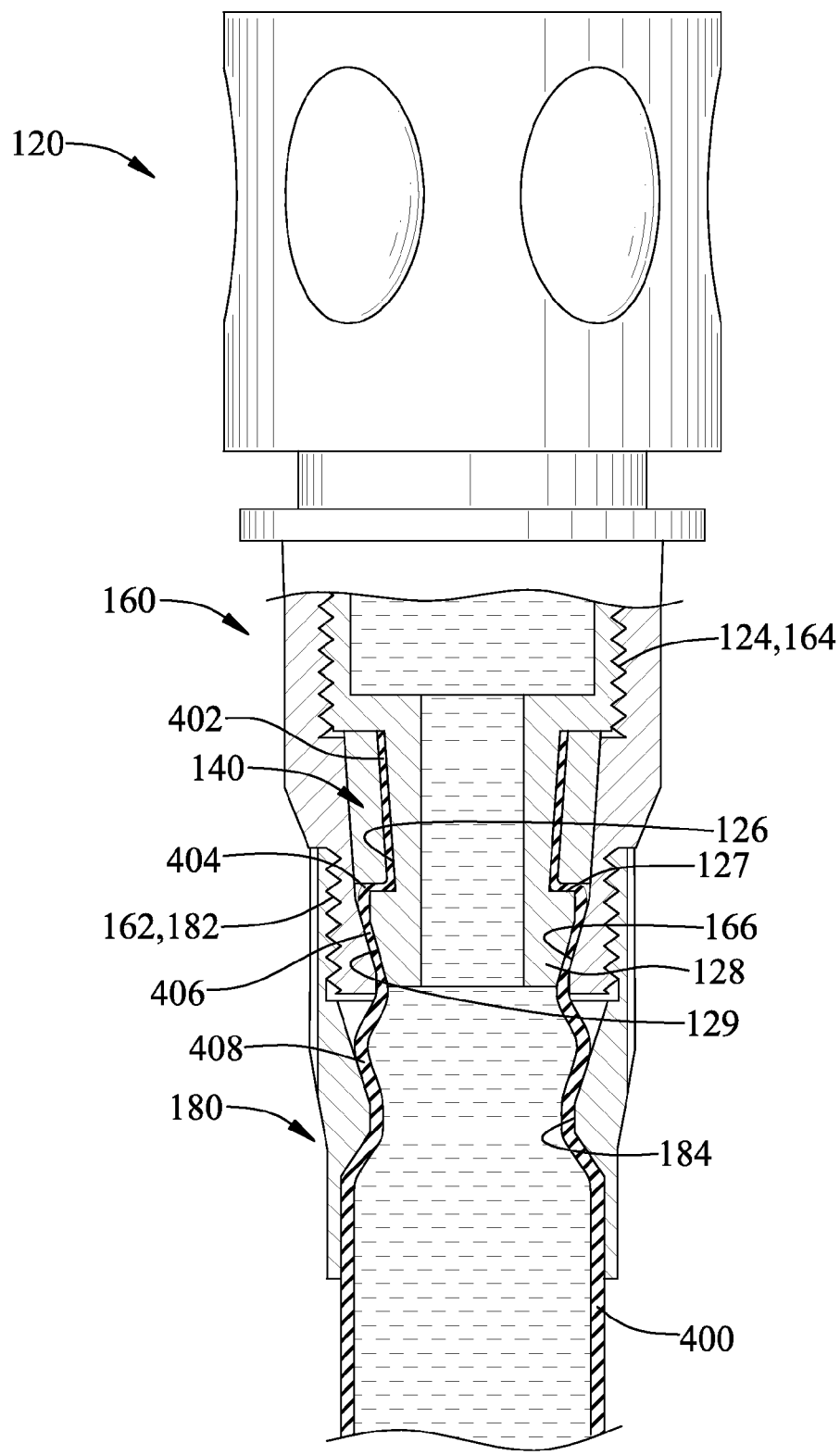
FIG. 4 is a cross-sectional view of the joint and the expansible hose in another position than shown in FIG. 13.
Figure 5:
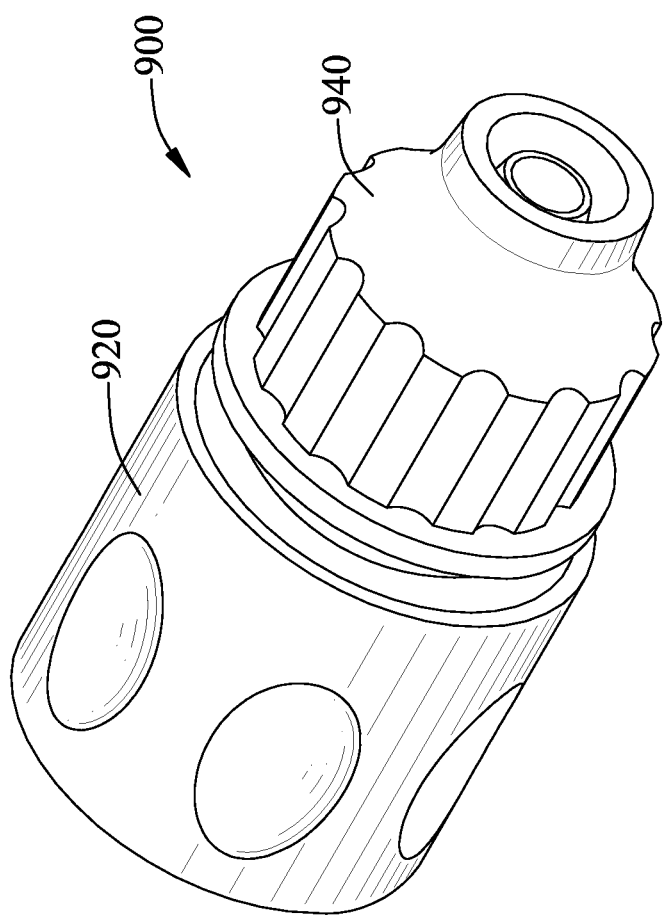
FIG. 5 is a perspective view of a conventional joint.
Figure 6:
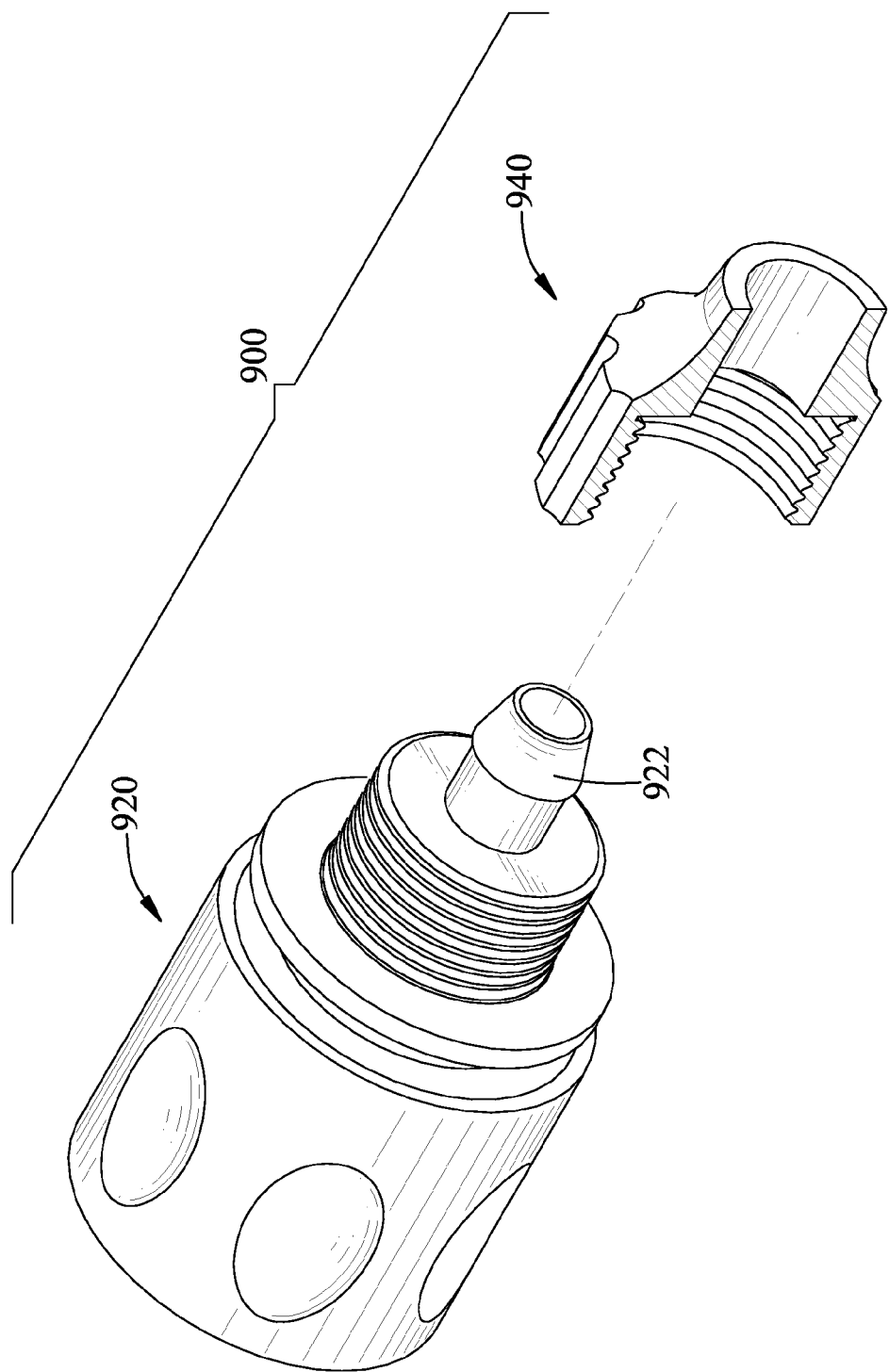
FIG. 6 is an exploded view of the joint shown in FIG. 5.
Figure 8:
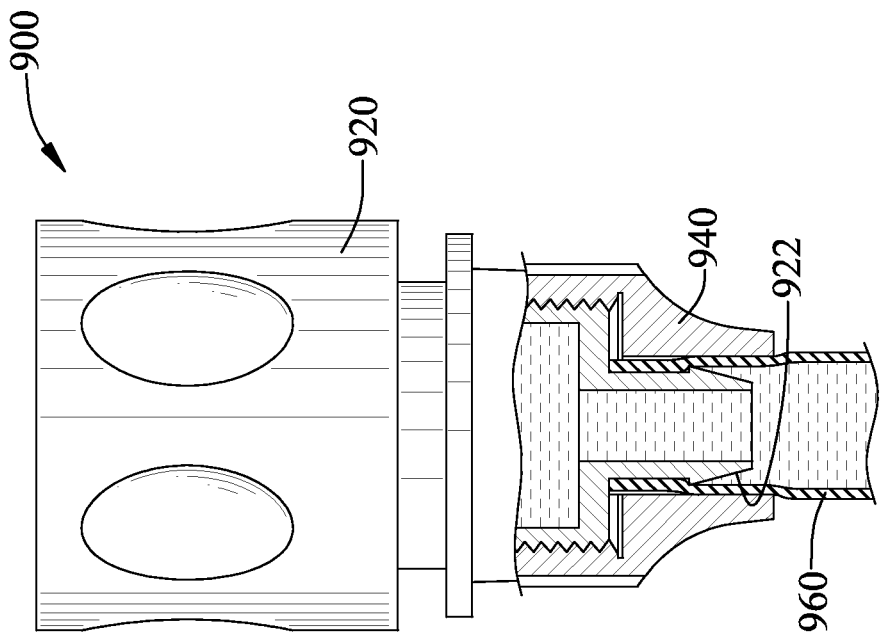
FIG. 8 is a cross-sectional view of the joint and the expansible hose in another position than shown in FIG. 7.
Figure 7:
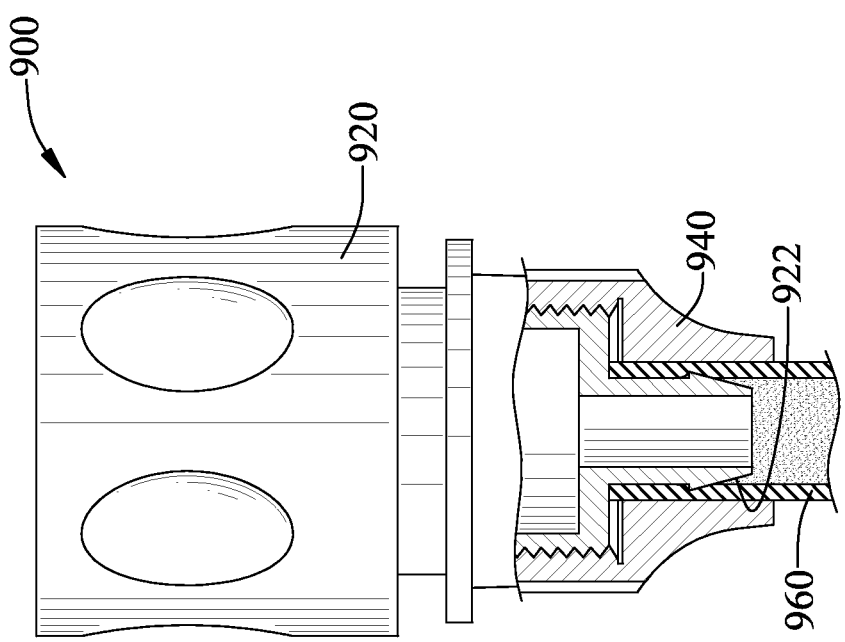
FIG. 7 is a cross-sectional view of the joint shown in FIG. 5 and an expansible hose.

Referring to FIG. 4, the expansible hose 400 is expanded by water that runs therein. The thickness of the expansible hose 400 is reduced as the length and diameter of the expansible hose 400 are increased. This reduction however does not render the expansible hose 400 slack in the joint 100 for reasons. At first, before the expansible hose 400 is expanded, the thickness of the first section 402 of the expansible hose 400 is reduced since the first section 402 of the expansible hose 400 is pressed tight between the neck 126 and the C-clip 140 as mentioned above. Secondly, before the expansible hose 400 is expanded, the thickness of the third section 406 of the expansible hose 400 is reduced since the third section 406 of the expansible hose 400 is pressed tight between the head 128 and the first ring 160 as mentioned above. Thirdly, a fold between the first and second sections 402 and 404 of the expansible hose 400 is stuck between the nozzle 121 and the C-clip 140. Fourthly, a fourth section 408 of the expansible hose 400 is pressed tighter against the frusto-conical face 184 of the second ring 180 as the expansible hose 400 is expanded more. Hence, the expansible hose 400 is firmly connected to the joint 100 and there is no leak.

The first and second rings 160 and 180 are made as two individual elements as they are made by mold-injection of plastics in the preferred embodiment. The first and second rings 160 and 180 can however be made in one piece if they are made of metal in another embodiment.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A joint (100) for an expansible hose (400), the joint (100) including:
   a cylinder (120) formed with a thread (124) and a nozzle (121), wherein the nozzle (121) is formed with a neck (126) and a head (128), and wherein the head (128) is formed with a rear face (127) and a front face (129);
   a C-clip (140) formed with a front end and placed on a first section (402) of the expansible hose (400) so that the first section (402) of the expansible hose (400) is pressed on the neck (126) and that a second section (404) of the expansible hose (400) is placed between the front end of the C-clip (140) and the rear face (127) of the head (128) and that a fold between the first and second sections (402/404) of the expansible hose (400) is stuck between the nozzle (121) and the C-clip (140);
   a first ring (160) including a thread (164) engaged with the thread (124) of the cylinder (120) and a first frusto-conical face (165) in contact with the C-clip 140 so that the first section (402) of the expansible hose (400) is sandwiched between the C-clip (140) and the neck (126); and
   a second ring (180) connected to the first ring (160) and formed with a frusto-conical internal face (184) that cooperates with an end of the first ring (160) to provide a tapered annular space to allow water to expand and press a fourth section (408) of the expansible hose (400) against the frusto-conical internal face (184) of the second ring (180) so that the frusto-conical internal face (184) of the second ring (180) exerts an axial net force on the fourth section (408) of the expansible hose (400) toward the first ring (160).

2. The joint according to claim 1, wherein the first ring (160) includes a second frusto-conical face (166) in contact with a third section (406) of the expansible hose (400) so that the third section of the expansible hose (400) is pressed on the front face (129) of the head (128).

3. The joint according to claim 2, wherein the neck (126) includes a frusto-conical external face in contact with the first section (402) of the expansible hose (400), and wherein the C-clip (140) includes a frusto-conical internal face (142) in contact with the first section (402) of the expansible hose (400).

4. The joint according to claim 3, wherein the rear face (127) of the head (128) is a planar face so that there is a sharp angle between the planar rear face (127) of the head (128) and the frusto-conical external face of the neck (126).

5. The joint according to claim 4, wherein the front face (129) of the head (128) is a frusto-conical face for contact with the third section (406) of the expansible hose (400).

6. The joint according to claim 1, wherein the first and second rings (160/180) are made two individual elements.

7. The joint according to claim 6, wherein the first ring (160) is formed with a thread (162), and wherein the second ring (180) includes a thread (182) engaged with the thread (162) of the first ring (160).

* * * * *